Figure 1:
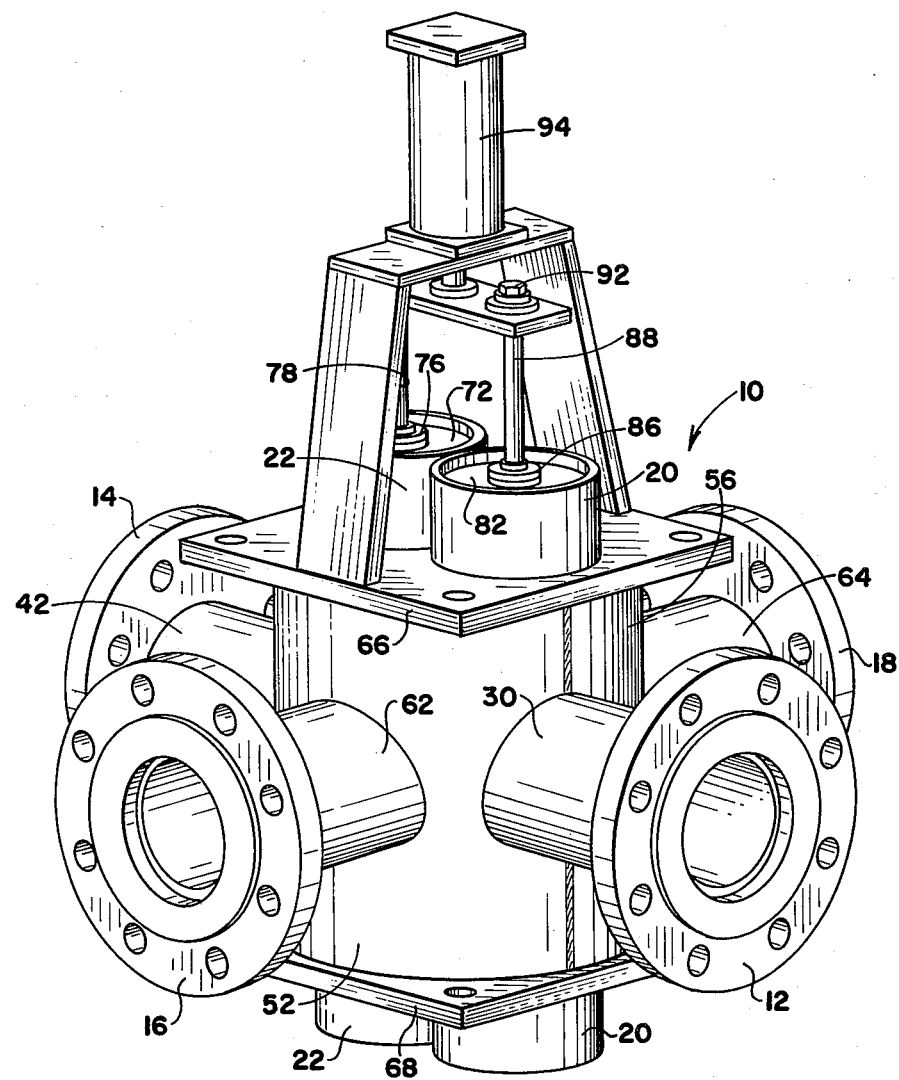
Figure 2:
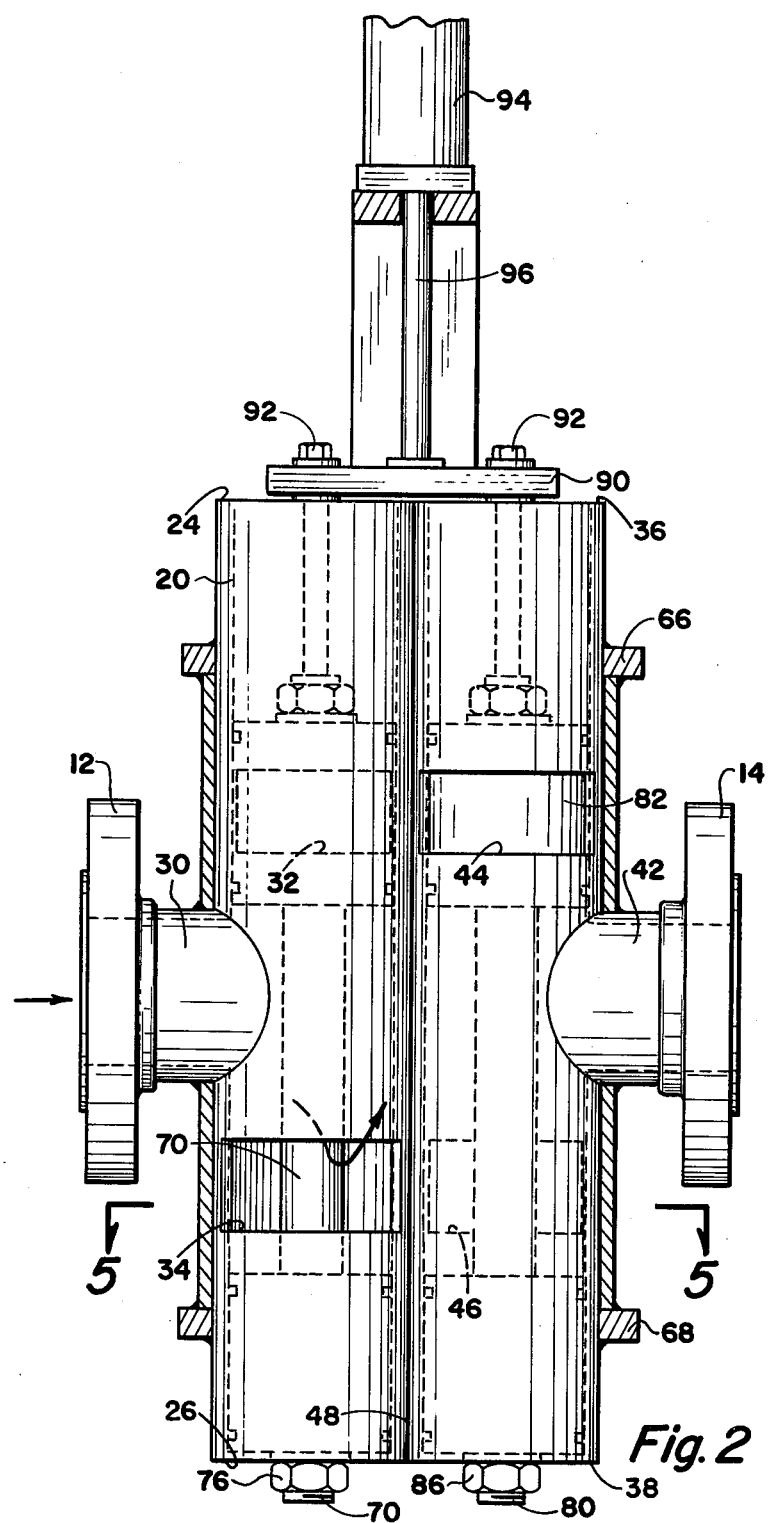
Figure 3:
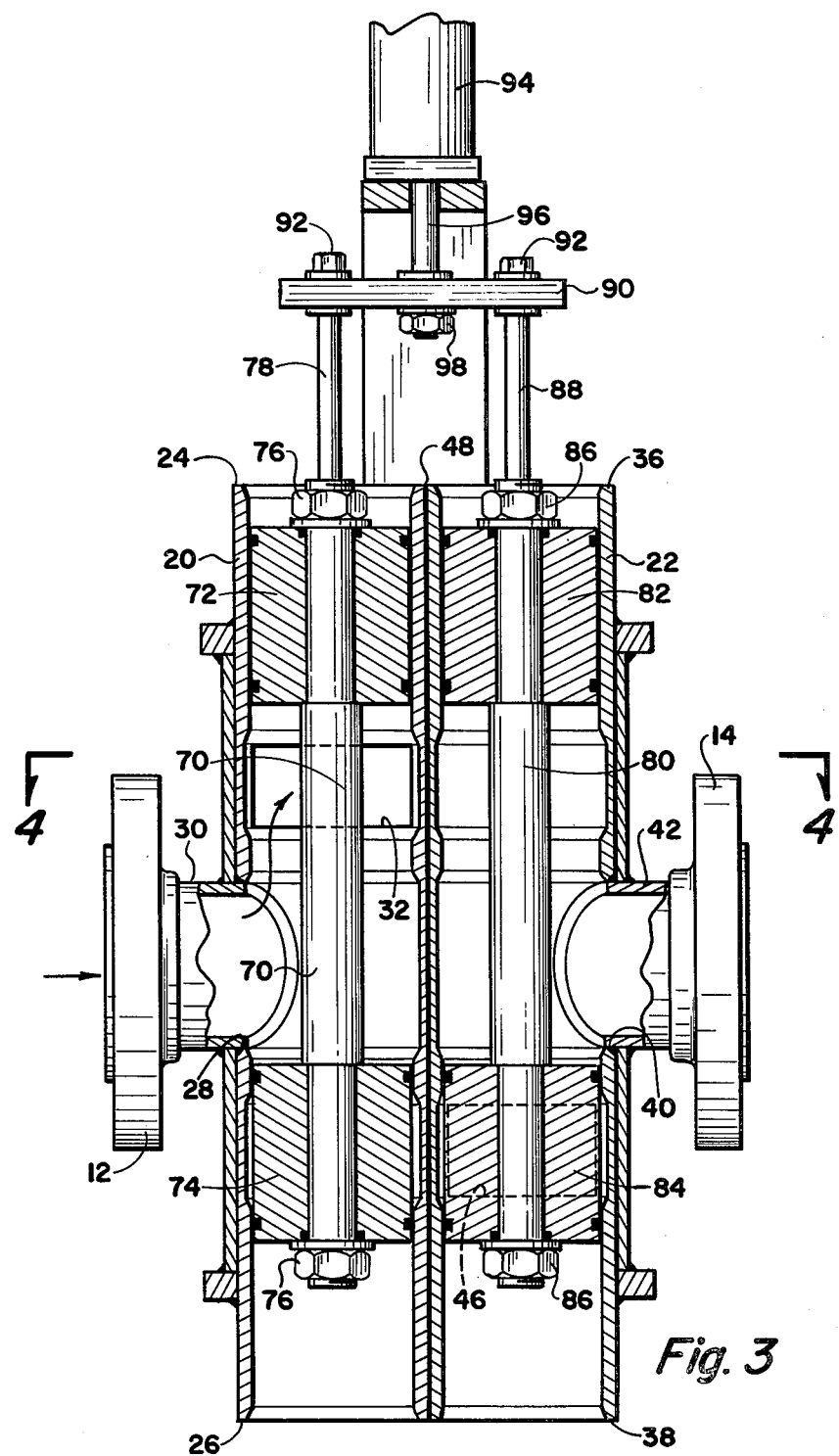
Figure 4:
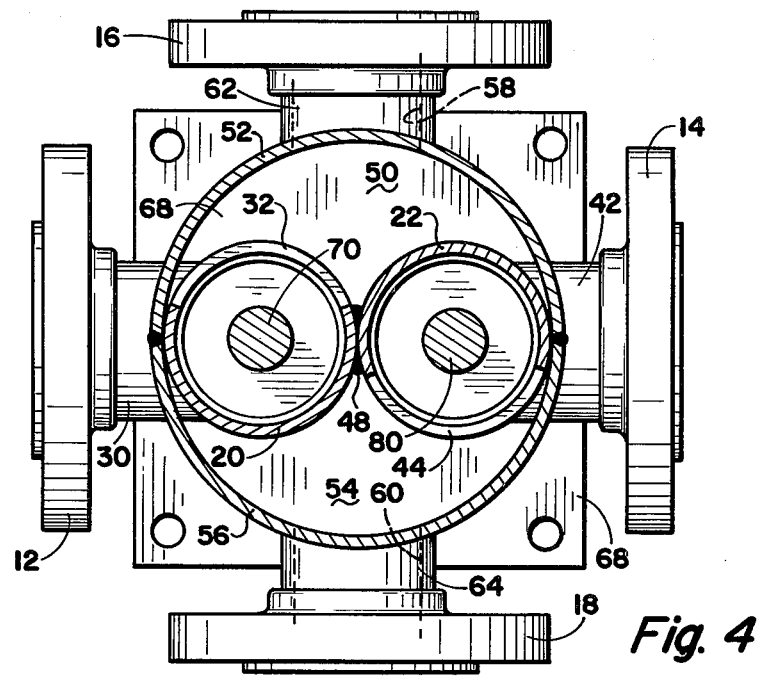
Figure 5:
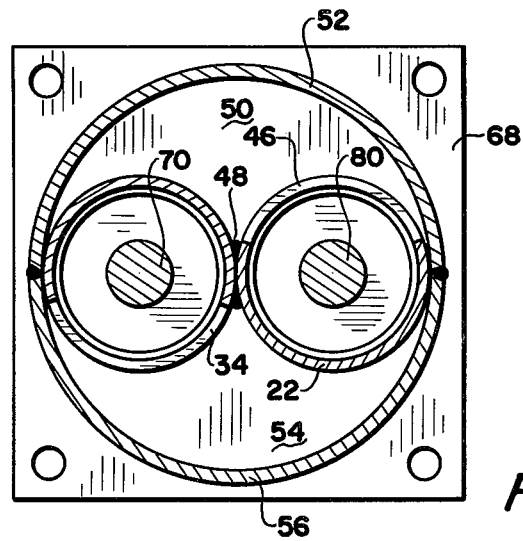

United States Patent [19]

Robb

[11] Patent Number: 4,460,017

[45] Date of Patent: Jul. 17, 1984

[54] FOUR-WAY VALVE

[76] Inventor: Wendell E. Robb, 3204 S. 85 E. Ave., Tulsa, Okla. 74145

[21] Appl. No.: 391,006

[22] Filed: Jun. 23, 1982

[51] Int. Cl.$^3$ .............................................. F17D 3/18
[52] U.S. Cl. ........................... 137/625.43; 137/596.18; 137/637; 137/869
[58] Field of Search .................... 137/637, 595, 625.43, 137/596.15, 596.18, 862, 869, 870; 73/3; 91/466; 137/597, 309

[56] References Cited

U.S. PATENT DOCUMENTS

| | | | |
|---|---|---|---|
| 2,754,840 | 7/1956 | Hicks | 137/596.15 |
| 2,974,643 | 3/1961 | Gillham et al. | 91/466 X |
| 3,364,943 | 1/1968 | Keller | 137/596.18 |
| 3,580,284 | 5/1971 | Bini et al. | 137/595 X |
| 3,605,810 | 9/1971 | Moroney | 137/625.43 |
| 3,668,923 | 6/1972 | Grove et al. | 73/3 |
| 3,682,198 | 8/1972 | Davis et al. | 137/625.43 |
| 3,972,347 | 8/1976 | Perkins | 137/596.18 |

Primary Examiner—Martin P. Schwadron
Assistant Examiner—Stephen M. Hepperle
Attorney, Agent, or Firm—Head, Johnson & Stevenson

[57] ABSTRACT

A flow diversion valve having first and second tubular spool housings joined at a contiguous edge to form an assembly, each of the housings having a flow passageway intermediate the housing ends, the passageways being opposite each other, and each of the housings having first and second ports formed in the sidewall spaced 90° from the flow passageways, with each housing having one port towards one end and the other port towards the other end, with the ports being on opposite sides, and the valve having a closed chamber on each side of the assembly connecting one port of each of the spool housings, each of the flow chambers having a flow passageway therein so that the valve has a total of four flow passageways, and a spool slidably positioned in each of the spool housings, each of the spools having spaced apart pistons sealably engaging the internal surfaces of the housing, the spools being connected for conjoint reciprocal positioning within the spool housings so that in one position one port in the first spool housing communicates with one port of the second spool housing, and in another position, the other ports of the spool housing are connected, thereby providing means of switching the direction of fluid flow within the valve.

3 Claims, 5 Drawing Figures tion of the valve would be the same if the interior of the spool housings were completely cylindrical. The illustration of internal machining to provide improved sealing arrangements is merely exemplary of ways in which the valve may be improved according to the demands to which the valve is to be used. The assembly of the valve is initiated by first welding along line 48 the first and second tubular spool housings 20 and 22 together to form an assembly. Next the semi-cylindrical barrel members 52 and 56 are welded to the assembly. End plates 66 and 68 are then welded in position. In some instances, it may be desirable that the short length of pipes 30 and 32 connecting with the fluid passageways 28 and 40 in the first and second spool housing be welded in position before the semi-cylindrical barrel members 52 and 56 are placed in position and welded. The pipes 62 and 64 can then be welded to the semi-cylindrical barrel members. After the body of the valve is completely assembled the spools can be inserted, and it can be seen that the valve can be completely repaired by removing the spools without otherwise disassembling the valve in any way.

The valve provides a highly useful diverting valve which accomplishes flow diversion in a simple, straightforward manner without requiring extensive linkages and is adaptable to the use of commercially available valve actuators exemplified by cylinder 94.

In the embodiment of the invention illustrated the spacing between pistons 72, 74 and 82, 84 is arranged so that the upper and lower ports will not be closed at the same time. This arrangement is desirable especially when the valve is used for a meter prover application in that it prevents the blockage of fluid flow through the valve at any time, even when the spools are being shifted to change the direction of fluid flow. If desirable, however, the spacing between the pistons can be arranged so that in one position of the spools the flow of fluid through the valve is completely blocked.

The preferred arrangement of the valve is illustrated in which the ports are staggered, permitting the spools to be moved in the same direction to change the direction of fluid flow through the valve, such as by means of yoke 90. If ports 32 and 44 and ports 34 and 46 are on the same side of the spool housing assembly, then to change fluid flow direction the spool in housing 20 would be moved in one direction while the spool in housing 22 is moved in the opposite direction. While this arrangement would function satisfactorily, a more complex mechanism for shifting the spools would be required. For this reason, the embodiment in which the location of the ports are staggered, as illustrated, is preferred.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed:

1. A flow diverter valve comprising:
a first tubular spool housing having first and second ends, having a first flow passageway in the sidewall intermediate the ends, having a first port opening between the flow passageway and the first end and a second port opening between the flow passageway and the second end, the first and second port openings being on opposite sides of the spool housing and 90° from said flow passageway;

a second tubular spool housing having first and second ends, having a second flow passageway in the sidewall intermediate the ends, having a first port opening between the flow passageway and the first end and a second port opening between the flow passageway and the second end, the first and second port openings being on opposite sides of the spool housing and 90° from the flow passageway, the first and second spools being assembled contiguous to each other in parallel arrangement with the contiguous exterior surfaces sealed and with said first and second flow passageways being opposite each other, forming a spool housing assembly, and wherein the first port opening of the first spool housing and the second port opening of the second spool housing are on the same side of the spool housing assembly and the second port opening of the first spool housing and the first port opening of the second spool housing being on the other side of the assembly;

means forming a first closed chamber on one side of the spool housing assembly encompassing said first spool housing first port and said second spool housing second port, and having a third flow passageway therein;

means forming a second closed chamber on the other side of the spool housing assembly encompassing said first spool housing second port and said second spool housing first port and having a fourth flow passageway therein;

a first spool member slidably received in said first spool housing and having spaced apart first and second piston members;

a second spool member slidably received in said second spool housing and having spaced apart first and second piston members; and means for simultaneously positioning said spool members between two positions whereby in one position communication is provided between said first flow passageway and said first spool housing first port and between said second flow passageway and said second spool housing first port and in the other position communication is provided between said first flow passageway and said first housing second port and said second flow passageway and said second housing second port, communication being thereby provided in the first position between said first and third flow passageways and said second and fourth flow passageways and in the second position between said first and fourth passageways and between said second and third passageways.

2. A flow diverter valve according to claim 1 wherein each of said spool members is formed of a rod having said pistons thereon, and wherein a portion of each rod extends beyond the first end of the spool housing in which it is received, and including
a yoke connecting said rods, said means of simultaneously displacing said spool members being connected to said yoke.

3. A flow diverter valve according to claim 1 wherein said means forming said first and second closed chambers is in the form of a semi-cylindrical housing, the housing being joined together to form a cylinder encompassing said spool housing assembly and including end plates closing the formed cylinder.

* * * * *